(12) United States Patent
Vondrak

(10) Patent No.: US 8,196,944 B1
(45) Date of Patent: Jun. 12, 2012

(54) MANEUVERING WHEEL FOR A WHEEL CHAIR OR SIMILAR APPARATUS

(76) Inventor: Kenneth S. Vondrak, Geneva, IL (US)

( * ) Notice: Subject to any disclaimer, the term of this patent is extended or adjusted under 35 U.S.C. 154(b) by 0 days.

(21) Appl. No.: 13/373,818

(22) Filed: Dec. 1, 2011

(51) Int. Cl.
*B62M 1/14* (2006.01)
(52) U.S. Cl. .................................. 280/250.1; 280/304.1
(58) Field of Classification Search ............... 280/250.1, 280/304.1
See application file for complete search history.

(56) References Cited

U.S. PATENT DOCUMENTS

| | | |
|---|---|---|
| 3,466,697 A | 9/1969 | Cain |
| 4,696,583 A * | 9/1987 | Gorges ............................ 384/49 |
| 4,778,041 A | 10/1988 | Blaurock |
| 5,409,265 A | 4/1995 | Douglass |
| 5,716,074 A | 2/1998 | Theodorou |
| 6,508,335 B2 | 1/2003 | Zinanti |
| 6,869,084 B2 * | 3/2005 | Volk et al. .................... 280/5.24 |
| 7,311,329 B2 | 12/2007 | Mulhern |
| 7,934,740 B2 | 5/2011 | Wilmot et al. |
| 2002/0070514 A1 | 6/2002 | Costa, Jr. et al. |
| 2006/0243497 A1 | 11/2006 | Orenbuch |
| 2009/0200788 A1 | 8/2009 | Dudal |

FOREIGN PATENT DOCUMENTS

| | | |
|---|---|---|
| GB | 2 338 703 A | 12/1999 |
| GB | 2 454 532 A | 5/2009 |
| JP | 9253269 A | 9/1997 |

* cited by examiner

*Primary Examiner* — Lesley D. Morris
*Assistant Examiner* — Marlon Arce
(74) *Attorney, Agent, or Firm* — Mathew R. P. Perrone, Jr.

(57) ABSTRACT

Wheeled carts, such as a wheel chair and similar devices have a steering wheel, with the steering wheel having a housing to receive the globular wheel, with a seal movably holding the globular wheel in the housing; and a series of friction-reducing bearings being positioned between the globular wheel and the interior of the housing, and held within the housing by the seal in combination with the globular wheel.

12 Claims, 4 Drawing Sheets

MANEUVERING WHEEL FOR A WHEEL CHAIR OR SIMILAR APPARATUS

This invention relates to a maneuvering wheel for a wheelchair, and more particularly to a maneuvering wheel for a wheelchair or a similar apparatus, which permits movement in a different direction, without moving the mounting for the maneuvering wheel, about the mount therefor.

BACKGROUND OF THE INVENTION

Wheeled carts, which are usually human propelled, have in common problems with a very restricted movement for the front wheels, thereof. The front wheels generally serve as maneuvering wheels or steering wheels. In the medical industry, typical examples of such wheeled carts are gurneys, laptop carts, cabinets and beds; to name a few. Currently, the front wheels of these wheeled carts must swivel 180 degrees in order for the particular wheeled cart to move in an opposite direction. For general consumer goods, items like dollies for moving heavy equipment, and grocery carts have problems such restricted movement of the wheels. However, this restricted movement is especially a problem with a wheelchair.

A wheelchair is chair with wheels, designed for use by a person, who either has difficulty with walking or cannot walk. Within the mechanics of a wheelchair are mounted a pair of support wheels, generally in the rear; and a pair of steering wheels or maneuvering wheels, generally in the front to support a chair or seat for a person, who has difficulty walking. With the two pair of wheels, the wheelchair is stable. With the support wheels and the steering, that is the front, wheels working to support the chair, that person in the chair can move or be moved to a desired location.

Currently, the front wheels of a wheelchair must swivel 180 degrees in order for the wheelchair, or similar apparatus, to move in an opposite direction. This requirement results in a number of problems. There is a problem with the storage of the wheelchair. There is another problem when the wheel chair contacts a soft floor surface. More complications occur when the wheelchair, especially with the passenger therein, is in a confined area.

The support wheels of one type of wheelchair for a human or person-propelled wheelchair usually rotate together on a common axle. In this case, the support wheels can be reached by the arms of the person sitting in chair. As the arms move the support wheels, the person in the chair can move to a location. By propelled in this manner is meant that the person sitting in the chair can propel the chair with arm strength by using the support wheels.

For a transport chair, the patient cannot propel the wheelchair with arm strength; but must either use foot and leg strength or be pushed by another person. The support wheels may be on the same axle, or each support wheel may be on a separate axle. The support wheels are generally too small to be reached by the arms of the person sitting on the seat portion of the chair.

On the other hand, each member of the pair of steering wheels rotates on its own axle, which is mounted within an axle housing. The axle housing itself also rotates also to provide steering for wheelchair, and has its rotation preferably perpendicular to the rotation of the support wheel axle.

Such a structure for steering wheels limits movement and steering of the wheelchair. Due to the usually perpendicular arrangement of the axles for each steering wheel, the steering wheels can and do work at cross purposes and against an efficient use of the wheelchair. It is very desirable to achieve more free movement for the maneuvering wheels for use efficiency, while maintaining or improving the utility of the wheelchair.

SUMMARY OF THE INVENTION

Among the many objectives of the present invention is the provision of a steering wheel for a wheelchair, which has a spherical support member that can move freely in a housing.

Another objective of the present invention is the provision of a steering wheel for a wheelchair, which has reduced complications with a second steering wheel for the wheelchair.

Yet another objective of the present invention is the provision of a steering wheel for a wheelchair, which simplifies movement of the wheelchair.

Still another objective of the present invention is the provision of a wheelchair, which has a spherical support member that can move freely in a housing for each of its steering wheels.

A further objective of the present invention is the provision of a wheel, which the wheeled device on which it is mounted can move easily on a soft floor.

A still further objective of the present invention is the provision of a wheel, which the wheeled device on which it is mounted can turn from any position, without rotating 180 degrees.

Yet a further objective of the present invention is the provision of a wheel, which minimizes storage problems.

Also an objective of the present invention is the provision of a steering wheel for a wheelchair, which minimizes problems caused by the wheelchair being in a confined area.

These and other objectives of the invention (which other objectives become clear by consideration of the specification, claims and drawings as a whole) are met by providing a steering wheel for a wheelchair, with the steering wheel having a shaft which receives a housing; which housing, in turn, receives a globular ball or globular wheel, with a seal movably holding the globular ball or globular wheel in the housing; and a series of friction-reducing bearings being positioned between the globular wheel or globular ball, and the interior of the housing, and held within the housing and the shaft by the seal in combination with the globular wheel globular ball.

BRIEF DESCRIPTION OF DRAWINGS

Throughout the figures of the drawings, where the same part appears in more than one figure of the drawings, the same number is applied thereto.

DESCRIPTION OF THE PREFERRED EMBODIMENTS

Figure 1:
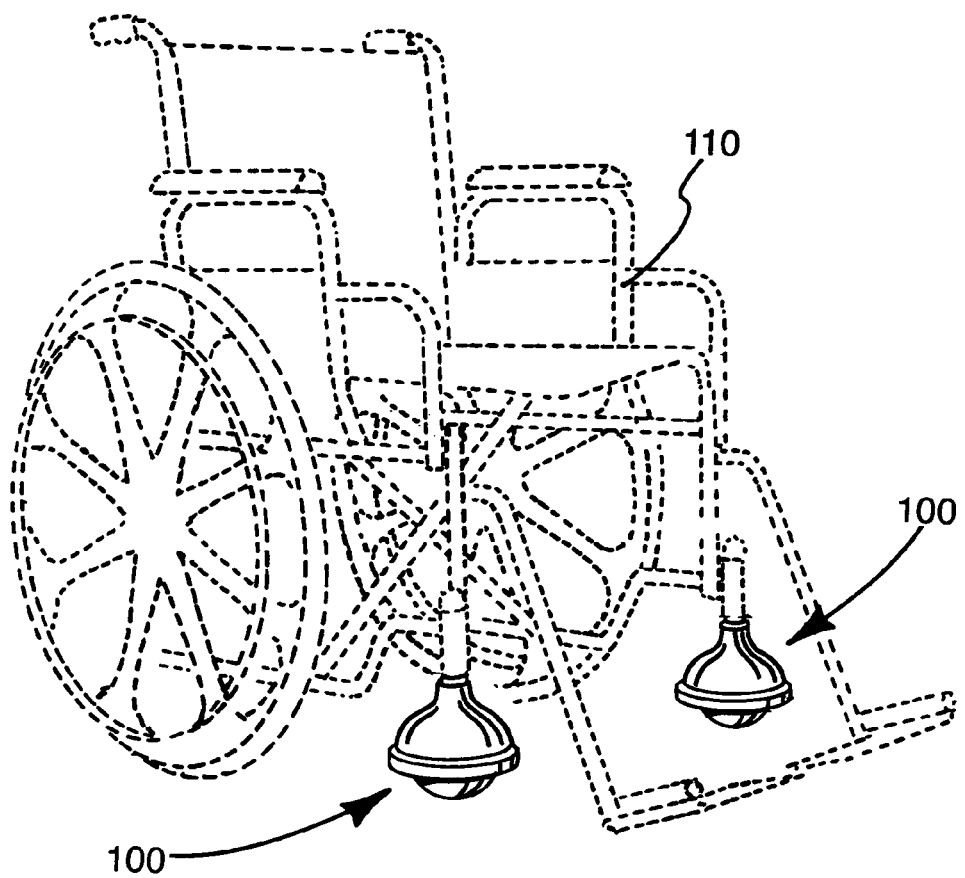
FIG. 1 depicts a perspective view of a steering wheel 100 of this invention in position on a wheelchair 110.

Reference will now be made in detail to several embodiments of the invention that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar to directional terms are not to be construed to limit the scope of the invention in any manner. The words attach, connect, couple, and similar terms with their inflectional morphemes do not necessarily denote direct or intermediate connections, but may also include connections through mediate elements or devices.

A wheel suitable for use on a wide variety of human propelled devices has a housing, which receives a globular ball. The top of the housing has a threaded aperture to receive a threaded shaft. Between the globular ball and the interior of the housing are situated ball bearings to provide maneuverability between the housing and globular ball.

Securing the globular ball, and hence the ball bearings, in the housing is a seal. The seal fits into a groove or retainer slot in the housing, thereby containing the globular ball and the ball bearings within the housing.

Into the threaded aperture on the top of the housing, may be inserted a cup separating the shaft from the ball bearings and as the shaft is threaded into the aperture. The cup creates a smooth interior for housing, even with the aperture therein.

However, the shaft preferably has an arc at the end thereof to create that smooth interior for the housing, to avoid the use of the above referenced cup. The opposing end of the shaft can then mount the wheel on a wheel chair or other desired human-propelled, wheeled vehicle. The maneuvering wheel can also used on a self propelled device, having an engine.

A permanent or temporary lubricating composition or coating can replace, or be used in combination with, the ball bearings. The ball bearings provide the most efficient structure.

Now considering FIG. 1, maneuvering wheel 100 is mounted on wheel chair 110. Maneuvering wheel 100 permits wheel chair 110 to be moved easily in any desired direction within the plane, on which wheel chair 110 is positioned.

Figure 2:
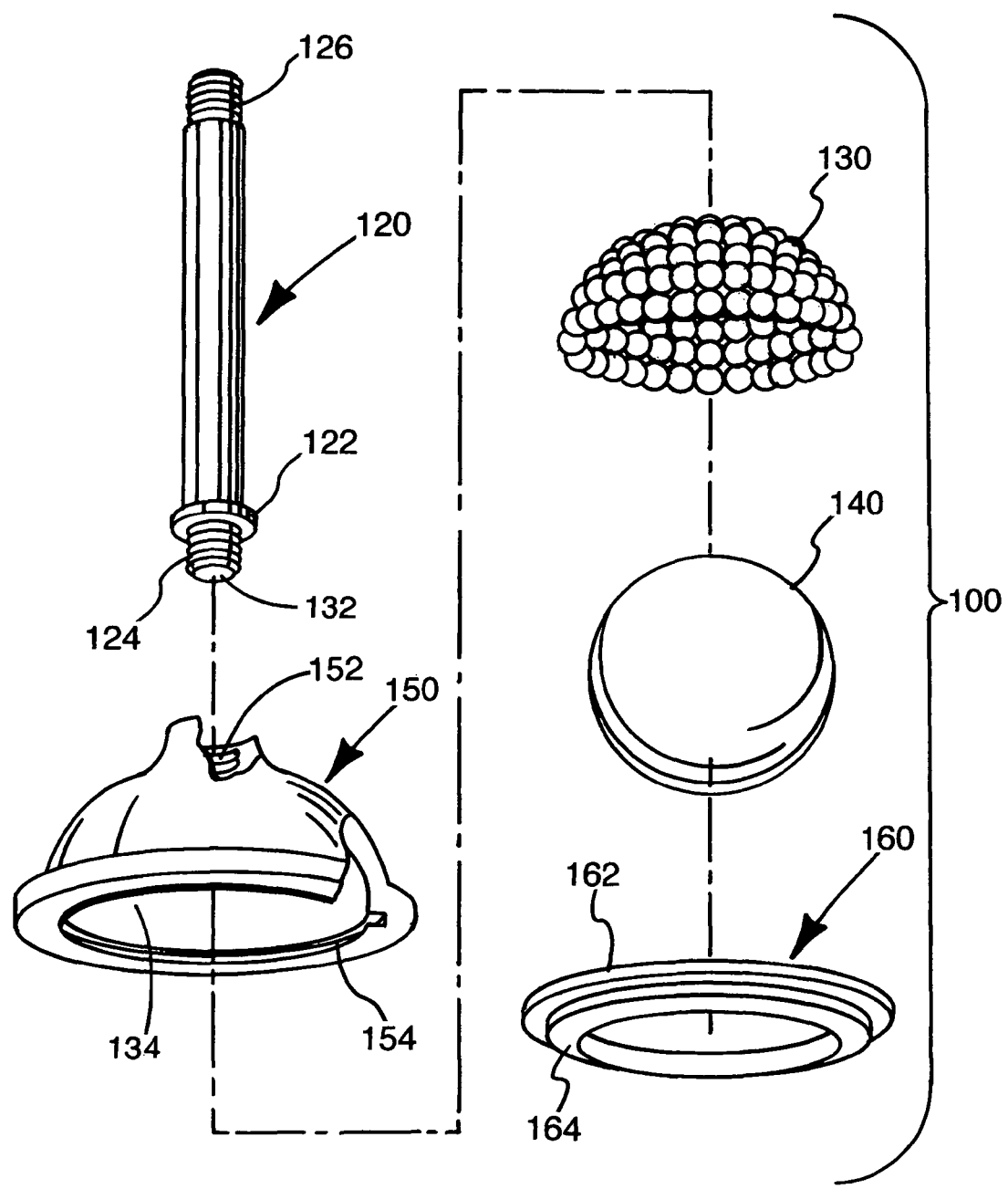
FIG. 2 depicts an exploded, perspective view of the steering wheel 100 of this invention.
Figure 3:
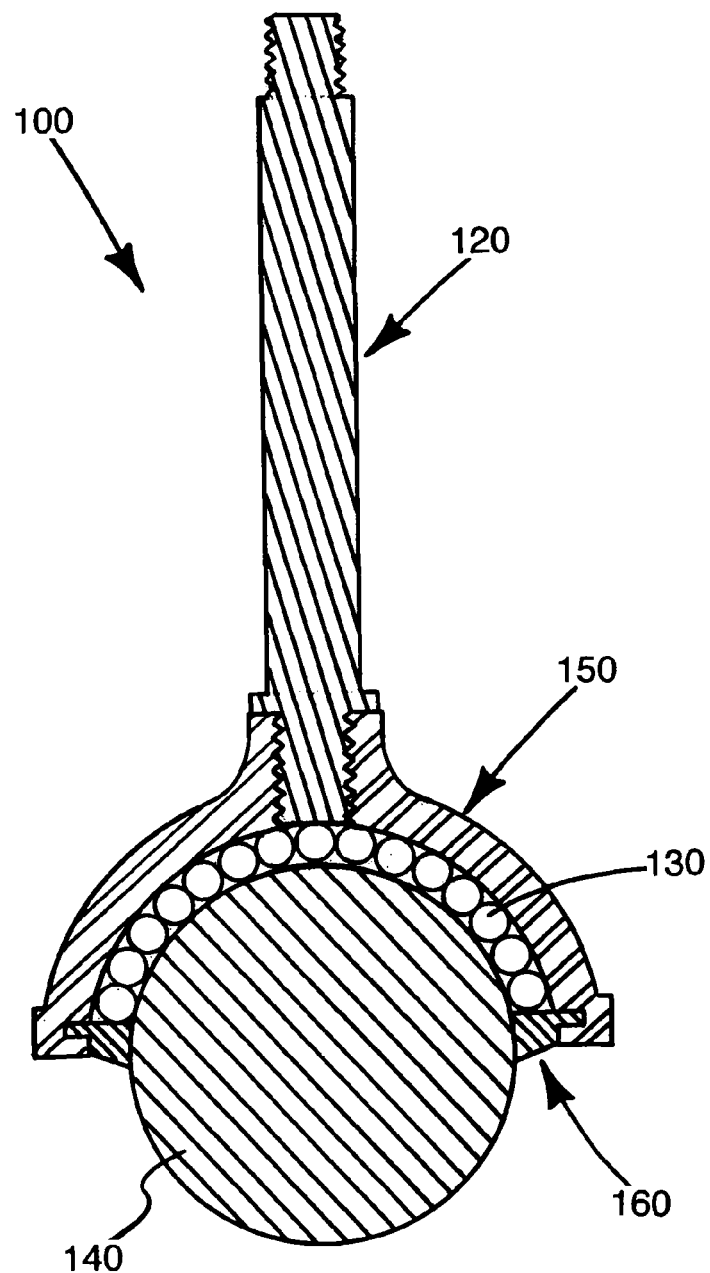
FIG. 3 depicts a plan, assembled, cross-sectioned view of the steering wheel 100 of this invention.

Adding FIG. 2 and FIG. 3 to the consideration, maneuvering wheel 100 has shaft 120 fitting into a bell shaped housing 150. Shaft 120 has a shim 122 with male housing threads 124 extending therebelow. Shim 122 may be a part of shaft 120, or added thereto as a separate piece if required for retrofitting of a wheel chair 110. Oppositely from male housing threads 124 on shaft 120 are mounting threads 126. Mounting threads 126 permit the mounting of maneuvering wheel 100 on wheel chair 110 on other device.

Within bell shaped housing 150 are situated ball bearings 130. Ball bearings 130 are held in a movable fashion within bell shaped housing 150 by globular ball 140. Female threaded aperture 152 in the top of bell shaped housing 150 can receive male housing threads 124 as well as provide a way to insert ball bearings 130 between bell shaped housing 150 and globular ball 140. Female threaded aperture 152 is preferably has a diameter parallel to diameter of the retainer slot 134 below described.

Male housing threads 124 preferably terminate in a female arc 132. Female arc 132 is preferably shaped to permit bearings 130 to roll freely between bell shaped housing 150 and globular ball 140 by completing a smooth arcuate surface for the interior 134 of bell shaped housing 140. Thus, the diameter of female arc 132 permits the interior 134 of bell shaped housing 140 to be a smooth arc facilitating the movement of ball bearings 130.

Oppositely disposed from female threaded aperture 152 in bell shaped housing 150 is retainer slot 154. Retainer slot 154 receives seal 160, to hold both globular ball 140 and ball bearings 130 in bell shaped housing 150. Shaft 120 also cooperates with seal 160 to hold ball bearings 130 in place. Thus, bell shaped housing 150 is preferably symmetrical about a vertical axis.

Seal 160 includes retainer collar 162 and dust shield 164. Retainer collar 162 fits into retainer slot 154 and holds globular ball 140 in bell shaped housing 150. As retainer collar 162 extends into dust shield 164, bearings 130 can be protected from dust or other contaminants. Then globular ball 140 can move more freely.

Figure 4:
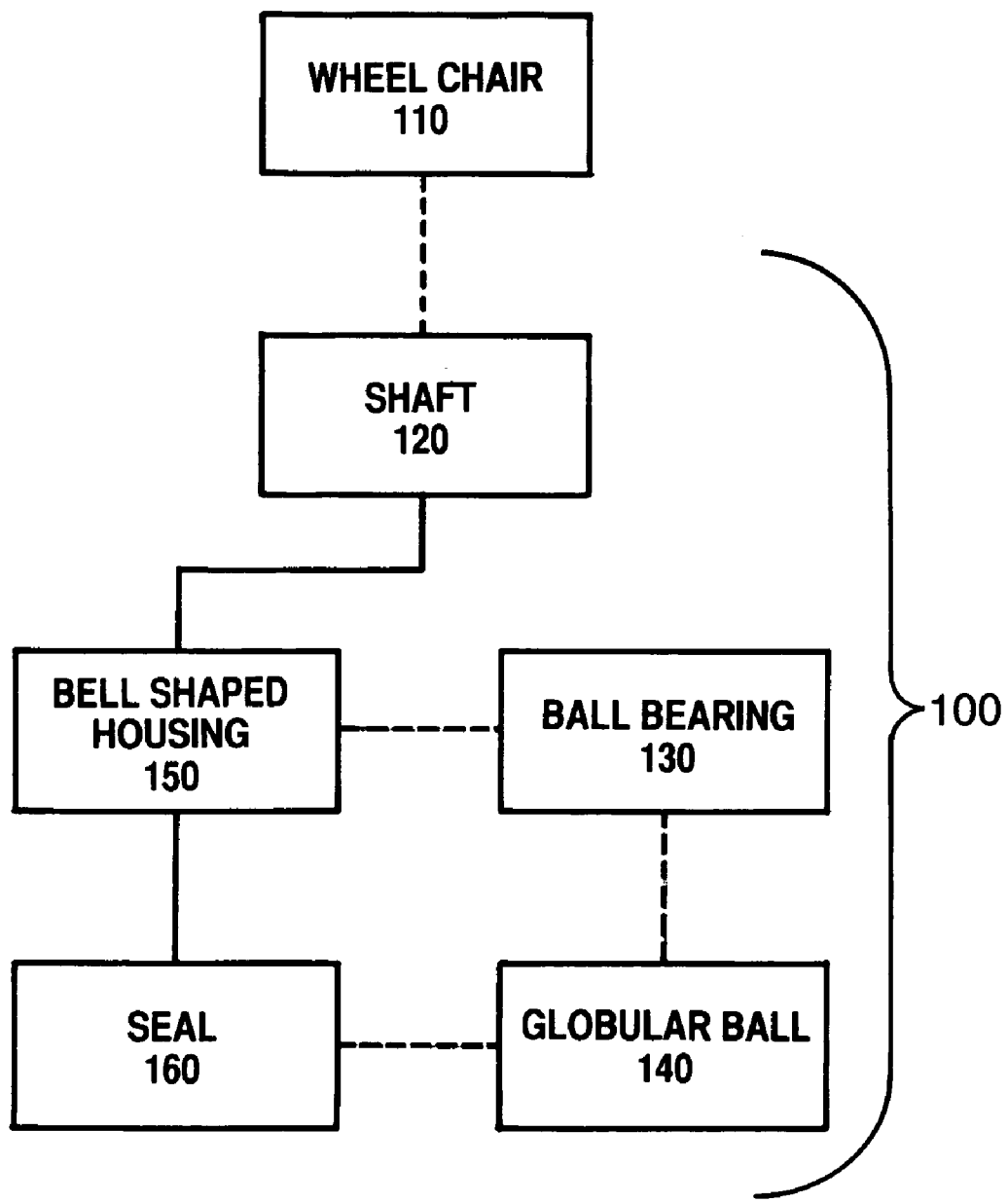
FIG. 4 depicts a block diagram steering wheel 100 of this invention.

Within FIG. 4, maneuvering wheel 100 is mounted on wheel chair 110. More particularly, shaft 120 connects bell shaped housing 150 to wheel chair 110. Bell shaped housing 150 receives globular ball 140 to hold ball bearings 130. Seal 160 mounts in bell shaped housing 150 and holds globular ball 140 in position. Shaft 120 and globular ball 140 position bearings 130 as desired in maneuvering wheel 100.

Bearings 130 may be combined with a lubricating coating on the globular ball 140 or in the bell shaped housing 150. The lubricating coating may be polytetrafluoroethylene, a silicone base, or similar coating. Bearings 130, however, are more durable and hence preferred.

This application—taken as a whole with the abstract, specification, claims, and drawings—provides sufficient information for a person having ordinary skill in the art to practice the invention disclosed and claimed herein. Any measures necessary to practice this invention are well within the skill of a person having ordinary skill in this art after that person has made a careful study of this disclosure.

Because of this disclosure and solely because of this disclosure, modification of this tool can become clear to a person having ordinary skill in this particular art. Such modifications are clearly covered by this disclosure.

What is claimed and sought to be protected by Letters Patent is:

1. A maneuvering wheel comprising;
   a) a housing to cooperating with a globular wheel;
   b) a seal movably holding the globular wheel within an interior of the housing;
   c) a friction-reducing element being positioned between the globular wheel and the interior of the housing;
   d) the friction-reducing element being ball bearings positioned between positioned between the globular ball and the interior of the housing;
   e) the ball bearings being held within the housing by the seal in combination with the globular wheel;
   f) the housing having a threaded aperture therein;
   g) the threaded aperture receiving a shaft;
   h) the shaft permitting mounting of the maneuvering wheel;
   i) the shaft having a housing end and a mounting end oppositely disposed from the housing end;
   j) the mounting including mounting threads for securing the maneuvering wheel to a wheeled vehicle; and
   k) the housing end including housing threads in order to permit the housing to be attached the shaft.

2. The maneuvering wheel of claim 1 further comprising:
   a) the shaft having a shim;
   b) the shaft having male housing threads;
   c) the male housing threads being at a housing end of the shaft and below the shim; and
   d) the shim limiting a housing distance for the shaft to enter the housing at the male housing threads.

3. The maneuvering wheel of claim 1 further comprising:
   a) the housing being a bell-shaped housing;
   b) a retainer slot being positioned on the interior and oppositely disposed from the threaded aperture;

c) the retainer slot receiving a seal to hold both the globular ball and the ball bearings in bell shaped housing; and
d) the shaft cooperates with the seal to hold the ball bearings in place.

4. The maneuvering wheel of claim 3 further comprising:
a) the seal including a retainer collar and a dust shield;
b) the retainer collar holding the globular ball in the bell shaped housing;
c) the retainer collar fitting into the retainer slot;
d) the retainer collar extending into the dust shield to restrict a dust flow into the bell shaped housing;
e) the housing threads including a concave surface at an end thereof to provide a smooth surface for the interior of the bell shaped housing.

5. In a wheeled vehicle including a directing wheel to provide a direction for the wheeled vehicle, an improvement for the wheeled vehicle comprising:
a) a maneuvering wheel replacing the directing wheel;
b) the maneuvering wheel having a housing and a globular wheel;
c) a housing to cooperating with a globular wheel;
d) a seal movably holding the globular ball within an interior of the housing;
e) a friction-reducing element being positioned between the globular wheel and the interior of the housing;
f) the shaft having a shim;
g) the shaft having male housing threads;
h) the male housing threads being at a housing end of the shaft and below the shim;
i) the shim limiting a housing distance for the shaft to enter the housing at the male housing threads;
j) the shaft having a housing end and a mounting end oppositely disposed from the housing end;
k) the mounting end including mounting threads for securing the maneuvering wheel to a wheeled vehicle; and
l) the housing end including housing threads in order to permit the housing to be attached the shaft.

6. The wheeled vehicle of claim 5 further comprising:
a) the friction-reducing element being ball bearings positioned between positioned between the globular ball and the interior of the housing;
b) the ball bearings being held within the housing by the seal in combination with the globular wheel;
c) the housing having a threaded aperture therein;
d) the threaded aperture receiving a shaft; and
e) the shaft permitting mounting of the maneuvering wheel.

7. The wheeled vehicle of claim 6 further comprising:
a) the housing being a bell-shaped housing;
b) a retainer slot being positioned on the interior and oppositely disposed from the threaded aperture;
c) the retainer slot receiving a seal to hold both the globular ball and the ball bearings in bell shaped housing; and
d) the shaft cooperates with the seal to hold the ball bearings in place.

8. The wheeled vehicle of claim 7 further comprising:
a) the seal including a retainer collar and a dust shield;
b) the retainer collar holding the globular ball in the bell shaped housing;
c) the retainer collar fitting into the retainer slot;
d) the retainer collar extending into the dust shield to restrict a dust flow into the bell shaped housing; and
e) the housing threads including a concave surface at an end thereof to provide a smooth surface for the interior of the bell shaped housing.

9. In a wheel chair including a directing wheel to provide a direction for the wheel chair, an improvement for the wheel chair comprising:
a) a maneuvering wheel replacing the directing wheel;
b) the maneuvering wheel having a housing and a globular wheel;
c) a housing to cooperating with a globular wheel;
d) a seal movably holding the globular ball within an interior of the housing;
e) a friction-reducing element being positioned between the globular wheel and the interior of the housing;
f) the friction-reducing element being ball bearings positioned between positioned between the globular ball and the interior of the housing;
g) the ball bearings being held within the housing by the seal in combination with the globular wheel;
h) the housing having a threaded aperture therein;
i) the threaded aperture receiving a shaft;
j) the shaft permitting mounting of the maneuvering wheel;
k) the shaft having a shim;
l) the shaft having male housing threads;
m) the male housing threads being at a housing end of the shaft and below the shim;
n) the shim limiting a housing distance for the shaft to enter the housing at the male housing threads;
o) the shaft having a housing end and a mounting end oppositely disposed from the housing end;
p) the mounting end including mounting threads for securing the maneuvering wheel to a wheeled vehicle; and
g) the housing end including housing threads in order to permit the housing to be attached the shaft.

10. The wheel chair of claim 9 further comprising:
a) the friction-reducing element being ball bearings positioned between positioned between the globular ball and the interior of the housing;
b) the ball bearings being held within the housing by the seal in combination with the globular ball;
c) the housing having a threaded aperture therein;
d) the threaded aperture receiving a shaft; and
e) the shaft permitting mounting of the maneuvering wheel.

11. The wheel chair of claim 10 further comprising:
a) the housing being a bell-shaped housing;
b) a retainer slot being positioned on the interior and oppositely disposed from the threaded aperture;
c) the retainer slot receiving a seal to hold both the globular ball and the ball bearings in bell shaped housing; and
d) the shaft cooperates with the seal to hold the ball bearings in place.

12. The wheel chair of claim 11 further comprising:
a) the seal including a retainer collar and a dust shield;
b) the retainer collar holding the globular ball in the bell shaped housing;
c) the retainer collar fitting into the retainer slot;
d) the retainer collar extending into the dust shield to restrict a dust flow into the bell shaped housing; and
e) the housing threads including a concave surface at an end thereof to provide a smooth surface for the interior of the bell shaped housing.

* * * * *